United States Patent
Kaneko et al.

[11] Patent Number: 6,140,600
[45] Date of Patent: Oct. 31, 2000

[54] ELECTRIC DISCHARGE MACHINING APPARATUS

[75] Inventors: Yuji Kaneko; Yoshihiro Watanabe, both of Kanagawa, Japan

[73] Assignee: Sodick Co., Ltd., Kanagawa, Japan

[21] Appl. No.: 09/247,564

[22] Filed: Feb. 10, 1999

[30] Foreign Application Priority Data

Feb. 10, 1998 [JP] Japan .................................. 10-044313

[51] Int. Cl.$^7$ ................................ B23H 1/02; B23H 7/02
[52] U.S. Cl. .................................. 219/69.13; 219/69.12; 219/69.18
[58] Field of Search ............................. 219/69.12, 69.13, 219/69.18, 69.16

[56] References Cited

U.S. PATENT DOCUMENTS

| | | | |
|---|---|---|---|
| 4,820,895 | 4/1989 | Obara .................................... | 219/69.13 |
| 5,170,026 | 12/1992 | Suga et al. ............................ | 219/69.12 |
| 5,254,826 | 10/1993 | Kimura et al. ........................ | 219/69.13 |
| 5,359,169 | 10/1994 | Kaneko .................................. | 219/69.18 |
| 5,986,232 | 11/1999 | Kaneko et al. ....................... | 219/69.18 |

FOREIGN PATENT DOCUMENTS 61-4620  1/1986  Japan .

*Primary Examiner*—Geoffrey S. Evans
*Attorney, Agent, or Firm*—Paul Devinsky; McDermott, Will & Emery

[57] ABSTRACT

An electric discharge machining apparatus including a first power source for applying machining voltage to a machining gap to generate an electric discharge, a second power source for applying voltage of equal to or lower than 20 V to the machining gap, a transistor switching bridge connected to both the workpiece and the tool electrode, a switch for selectively connecting one of the first and second power sources to the transistor switching bridge, a transistor controller for controlling on/off switching operation of the transistor switching bridge to alternatively change polarity of voltage being applied to the machining gap, a contact detector for electrically detecting the contact between the workpiece and the tool electrode when output of the second power source is applied across the machining gap, and an NC device which controls the switch so that the first power source is connected to the transistor switching bridge when the application of the machining power is required while the second power source is connected to the transistor switching bridge when detecting the contact by the contact detector is required.

1 Claim, 4 Drawing Sheets

ELECTRIC DISCHARGE MACHINING APPARATUS

FIELD OF THE INVENTION

The present invention relates generally to an electric discharge machining apparatus for machining a workpiece by generating an electric discharge across a machining gap formed between a tool electrode and the workpiece to be machined. More specifically, it relates to an electric discharge machining apparatus that applies a voltage pulse of one polarity and that of the other polarity selectively to the machining gap.

BACKGROUND OF THE INVENTION

A tool electrode made of copper or graphite for the electric discharge machine is juxtaposed with an electrically conductive workpiece, defining a clearance between the tool electrode and the workpiece, so-called "machining gap." The electric discharge machine is an apparatus that machines the workpiece by means of an electric discharge generated across the machining gap by intermittently applying voltage to this machining gap. The machining gap is filled with in a mineral-oil-based dielectric fluid or water-based dielectric fluid. On wire-cut electric discharge machines that use a traveling wire as a tool electrode, deionized water with a resistivity of 50,000 to 100,000 Ω·cm is usually used. When the high voltage is applied to the machining gap, resistivity of the dielectric fluid is decreased across the machining gap. Then, an electric discharge occurs causing the flow of current through the machining gap and the voltage drop. The current flows during a controlled ON-time, vaporizing and melting material of the workpiece. This molten portion is then flown out of the machining gap by means of a flow of the dielectric fluid. The dielectric fluid restores insulating properties when the application of the voltage is interrupted during a controlled OFF-time. Thus, a number of crater-like small cavities are formed on the surface of the workpiece in succession, removing the material of the workpiece to be machined. The electric discharge machine is provided with a machining power supply and controller that can control ON time and OFF time of the voltage pulse, the magnitude of the electric discharge current and the polarity of the voltage pulse. Usually, the polarity in which the workpiece is positively poled and the tool electrode is negatively poled is called "straight polarity", the reverse polarity is called "reverse polarity."

During the delay time in which an electric discharge does not occur though the voltage is applied across the machining gap, electrolysis may sometimes occur in the presence of the water-based dielectric fluid due to the difference in voltage between the tool electrode and the workpiece. This electrolysis results in the decomposition of the workpiece material positively charged, causing rusting of ferrous material and oxidation of nonferrous material. This undesirable electrolysis occurs not only on the workpiece but also on the work table and power supply cables. To avoid this undesirable electrolysis, the machining power supply that can supply the voltage pulse of the "reverse polarity" and that of the "straight polarity" selectively to the machining gap so that neither the polarity of the tool electrode nor that of the workpiece may outweighs the other may be used.

A method of bringing the tool electrode into contact with the workpiece to precisely locate the workpiece securely mounted on a work table is well known. In order to employ this method, an electric discharge machine has a power supply which is connected to both the tool electrode and the workpiece for continuously applying voltage across the machining gap, and a contact detector which detects that the voltage potential between the tool electrode and the workpiece becomes 0 V. The power supply for the contact detection is considerably lower in output voltage and smaller in current capacity than the machining power supply. The power supply for the contact detection including an AC power source is known. Since the power supply for the contact detection and the machining power supply are connected in parallel to the machining gap, it is necessary to make a provision to prevent the power supply for the contact detection from being damaged during electric discharge machining. For example, an electromagnetic switch is used to detach the power supply for the contact detection from the machining gap during electric discharge machining. In this case, it must be taken into account that the electromagnetic switch should not be closed until the voltage charged in the machining gap during electric discharge machining has naturally discharged. If the electromagnetic switch is closed before the voltage charged in the machining gap has been naturally discharged, the circuit for the power supply for the contact detection gradually deteriorates, and eventually it may break down. Therefore, the electromagnetic switch is controlled by the timer circuit in which the maximum value of the time presumably required for this natural electric discharge is set.

SUMMARY OF THE INVENTION

An object of the present invention is to provide an electric discharge machining apparatus that can protect a power supply for the contact detection with a simple construction and can prevent undesirable electrolysis.

An electric discharge machining apparatus of the present invention for machining a workpiece by supplying a series of voltage pulses to a machining gap formed between the workpiece to be machined and a tool electrode comprises:

a first power source for applying machining voltage to the machining gap;

a second power source for applying voltage of equal to or lower than 20 V to the machining gap;

a transistor switching bridge connected to both the workpiece and the tool electrode;

a switch for selectively connecting one of the first and second power sources to the transistor switching bridge;

a transistor controller for controlling on/off switching operation of the transistor switching bridge to alternatively change polarity of voltage being applied to the machining gap;

a contact detector for electrically detecting the contact between the workpiece and the tool electrode, and;

an NC device which controls the switch so that the first power source is connected to the transistor switching bridge when the application of the machining power is required while the second power source is connected to the transistor switching bridge when detecting the contact by the contact detector is required.

Other objects of the present invention will be partially discussed in the explanation which follows, or will be partially apparent to practitioners of the art through implementation of the invention.

PREFERRED EMBODIMENT OF THE INVENTION

Figure 1:
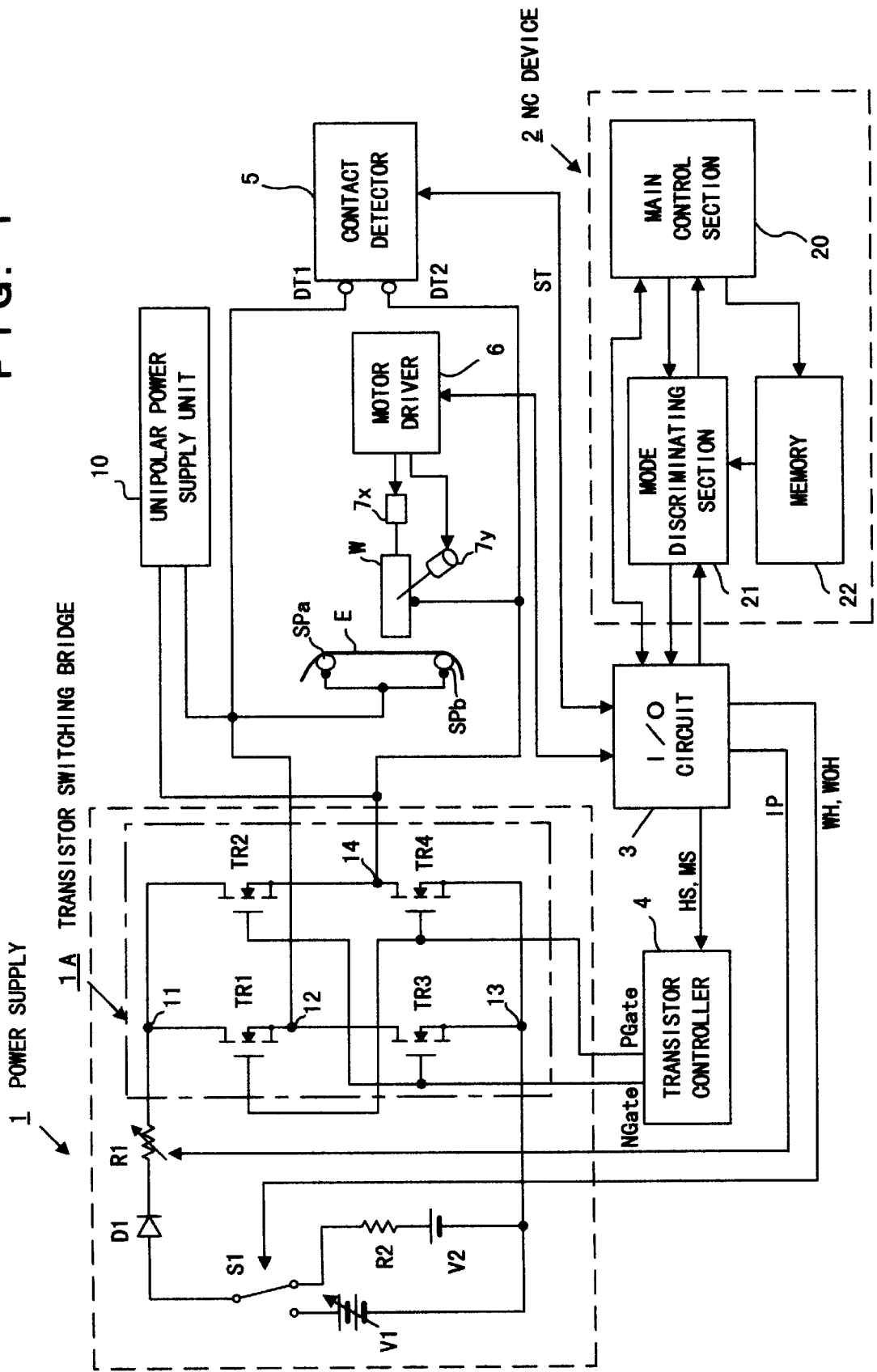
FIG. 1 is an overall block diagram showing an electric discharge machining apparatus of the present invention.

An electric discharge machining apparatus of the present invention will now be described with reference to FIG. 1.

A 0.03- to 0.3-mm-diameter wire electrode E made of brass or copper wire is guided by a pair of wire guides (not illustrated) in such a manner that it moves freely, and is juxtaposed with a workpiece W made of material such as steel or tungsten carbide. When the workpiece W is made of cemented carbide, the electrolysis depletes the cobalt binder material which holds carbide particle together. The electric discharge machining power is supplied to the wire electrode E from a first power source V1 via a pair of power-feed contacts SPa and SPb. A power supply 1 supplies the voltage pulses to the machining gap formed by the wire electrode E and the workpiece W. The power supply 1 comprises a first power source V1 for electric discharge machining that outputs voltages in the range of 80 to 150 V, a second power source V2 for contact detection that outputs voltages in the range of 5 to 20 V, preferably 5 V, a current limiting resistor selecting circuit R1, a current limiting resistor R2, a diode D1, a switch S1, and a transistor switching bridge 1A. In the illustrated embodiment, another power supply such as a unipolar power supply 10 and the power supply 1 are connected in parallel to the machining gap. The current limiting resistor selecting circuit R1 can select an appropriate current limiting resistor to determine the electric discharge current flowing through the machining gap, and is symbolically illustrated as a variable resistor in FIG. 1. The current limiting resistor R2 has a resistance of 100 to 200 Ω so that a current lower enough not to damage the surface of the workpiece W flows through the machining gap when the workpiece W is brought into contact with the wire electrode E. The diode D1 is a diode that prevents current from the unipolar power supply 10 from cutting in. The switch S1 consists of an electromagnetic switch, and selectively connects the transistor switching bridge 1A to one of the first and second power sources V1 and V2. Selecting the resistance value of the current limiting resistor selecting circuit R1 and switching over the switch 1 are controlled by the signal supplied from the NC device 2 via an I/O circuit 3. The transistor switching bridge 1A comprises four MOS-FET type transistor elements TR1, TR2, TR3 and TR4 to form four sequential nodes 11, 12, 13 and 14, as shown in FIG. 1. The nodes 11 and 13 are respectively connected to the current limiting resistor selecting circuit R1 and negative terminals of the power sources V1 and V2. The nodes 12 and 14 are respectively connected to the wire electrode E and the workpiece W. The transistor switching bridge 1A converts the output of the first power source V1 or the second power source V2 to pulses and at the same time switches over its polarity. The transistor switching bridge 1A is controlled by the output signals NGate and PGate from the transistor controller 4. The NC device 2 decodes an NC program consisting of a number of coded instructions and runs the NC program controlling the operation of the machine.

The NC device 2 includes a main control unit 20 having a display and an input device, a mode discriminating section 21, and a memory 22. The memory 22 stores the set value defining a frequency at which the alternating voltage is applied between the wire electrode E and the workpiece W. The detailed description on the mode discriminating section 21 will be given later. The I/O circuit 3 is an interface circuit that connects the power supply 1, the transistor controller 4, the contact detector 5, the motor driver 6, etc. to the NC device 2, and inputting and outputting of the signals between the NC device 2 and other constitutional members are performed via the I/O circuit 3. The transistor controller 4 produces the control signals PGate and NGate that control on/off switching operation of the transistor elements TR1, TR2, TR3, and TR4 in the transistor switching bridge 1A according to the signals representative of the setting of the machining conditions sent from the NC device 2 via the I/O circuit 3. The control signal PGate is sent to the transistor elements TR1 and TR4, and the NGate is sent to the transistor elements TR2 and TR3. Based on these signals, the transistor switching bridge 1A generates the bipolar voltage as follows.

Firstly, let it now be supposed that the switch S1 connects the transistor switching bridge 1A to the first power source V1. When the output signal PGate of the transistor controller 4 is in a high level and the output signal Ngate is in a low level, the transistor elements TR1 and TR4 are in conductive state and the transistor elements TR2 and TR3 are in non-conductive state. The positive terminal of the first power source V1 is connected to the wire electrode E via the diode D1, the variable resistor R1, and the transistor element TR1, and the negative terminal is connected to the workpiece W via the transistor element TR4. Therefore, so-called "reverse polarity" voltage pulse is applied to the machining gap. After the delay time current flows through the machining gap during a set ON-time. When the ON-time terminates, the signal Pgate goes low. During a set OFF-time, the transistor elements TR1, TR2, TR3 and TR4 are in non-conductive state to restore resistivity of the dielectric fluid in the machining gap. When the set OFF-time terminates, the signal NGate goes high and the transistor elements TR1 and TR4 turns to conductive state. The negative terminal of the first power source V1 is connected to the wire electrode E, and the positive terminal is connected to the workpiece W. Therefore, so-called "straight polarity" voltage pulse is applied to the machining gap to generate an electric discharge. Thus, the PGate pulse signal and the NGate pulse signal turn ON alternately in a predetermined cycle, enabling the bipolar voltage pulse to be applied to the machining gap. As the switch S1 is connected to the first power source V1 that supplies the electric discharge machining energy to the machining gap, when an electric discharge takes place, the current limited by the variable resistor R1 flows via the machining gap, commencing electric discharge machining.

Secondly, let it now be supposed that the switch S1 is connected to the second power source V2. The transistor controller 4 generates the PGate pulse signal and the NGate pulse signal alternately in a predetermined cycle, and a pair of transistor elements TR1 and TR4 and the other pair of transistor elements TR2 and TR3 alternately turn to conductive state without OFF-time. As the output voltage of the second power source V2 is extremely low, preferably 5V, and the current limiting resistor R2 is provided between the second power source V2 and the contact of the switch S1, the workpiece W is not affected by an electric discharge.

Figure 2:
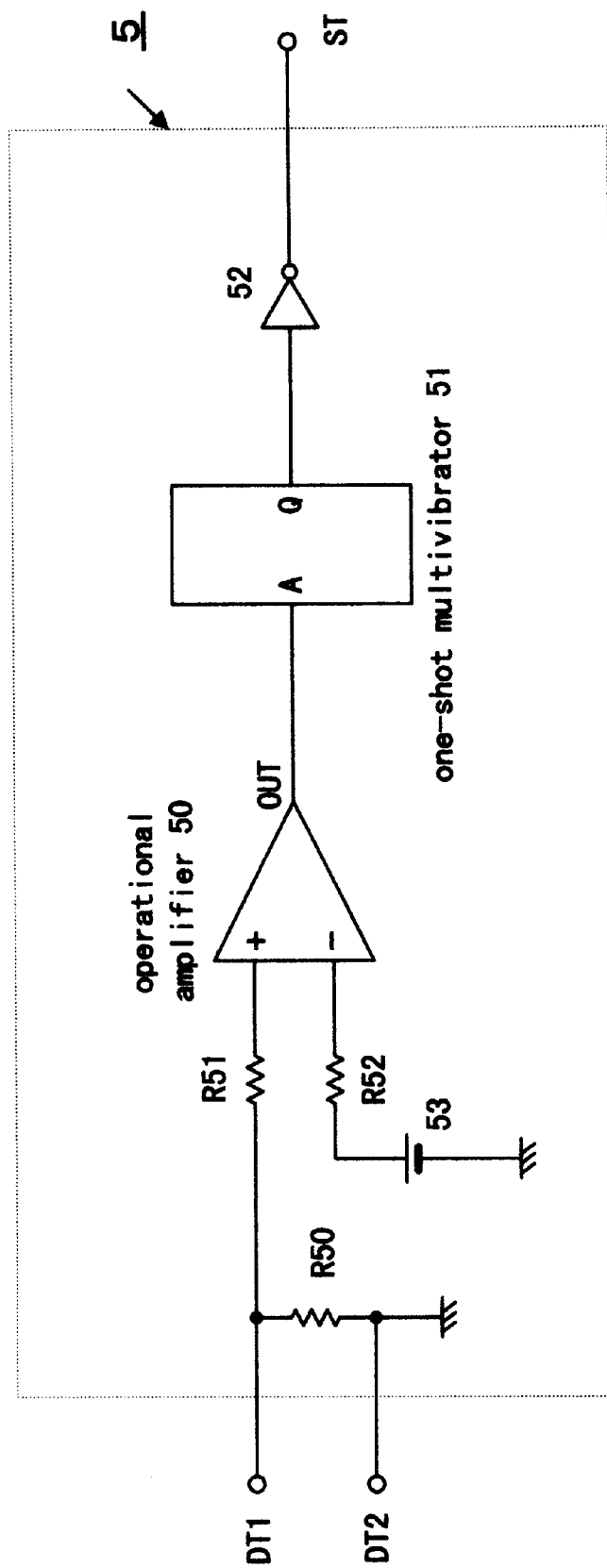
FIG. 2 is a drawing showing contact detector 5 of FIG. 1.

Next, the contact detector 5 will now be described in detail with reference to FIG. 2.

Figures 3A, 3B, 3C, 3D:
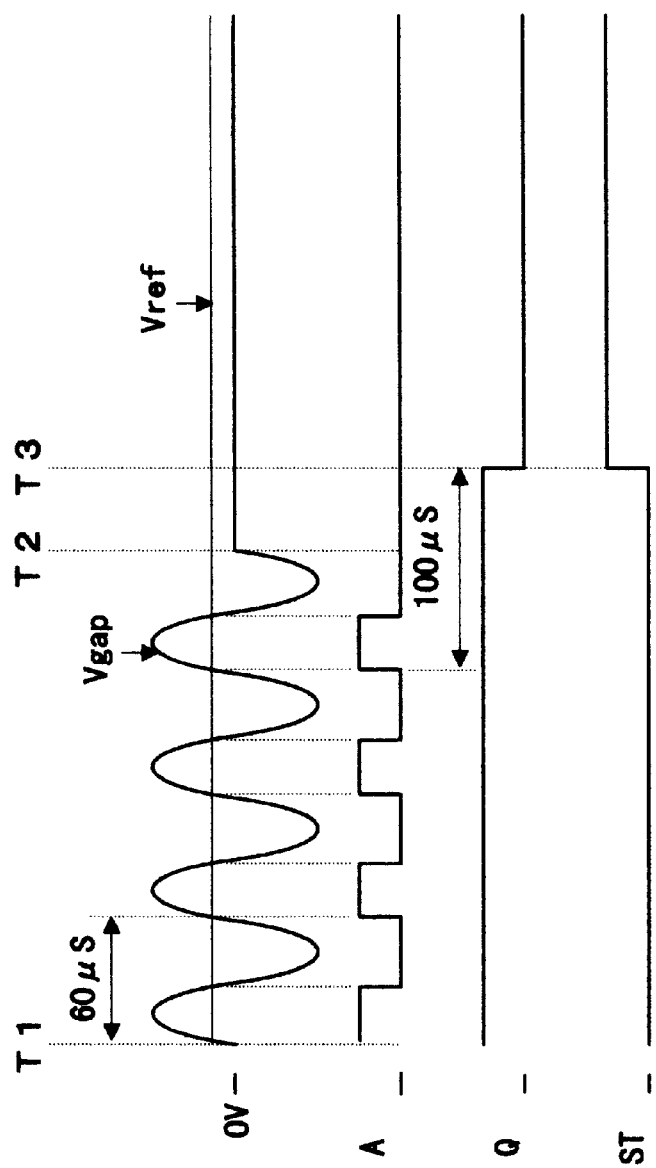
FIGS. 3A, 3B, 3C, and 3D are timing charts showing the operations of contact detector 5.

The contact detector 5 detects the voltage between the wire electrode E and the workpiece W, and determines that the workpiece W has been brought into contact with the wire electrode E, based on the detected voltage. In the illustrated embodiment, the contact detector 5 comprises a comparator 50 consisting of an operational amplifier, a power source 53, resistors R50, R51 and R52, a one shot multivibrator 51 which holds the high level output signal for a predetermined length of time, and a buffer 52. The input line DT1 whose one end is connected to the wire electrode E and the other end to between the resistors R50 and R51, and the resistor R51 is connected to the plus (+) terminal of the comparator 50. The input line DT2 whose one end is connected to the workpiece W and the other end to the ground along with the resistor R50. The power source 53 voltage of which is 1 to 1.5 V is connected to the minus (−) terminal of the comparator 50 via the resistor 52. The output OUT of the comparator 50 goes to high level when the input voltage Vgap received on its plus (+) terminal is higher than the reference voltage Vref, as illustrated in FIG. 3B, and goes to low level when it is not. The output OUT of the comparator 50 is connected to the input A of the one shot multivibrator 51, which starts operating at the moment when the output from the comparator 50 turns from low level to high level, and holds high level for 100 $\mu$sec at its output Q. The output Q of the one shot multivibrator 51 is connected to the input side of the inverter 52, and the output signal ST of the inverter 52 is sent to the NC device 2 via the I/O circuit 3. The inverter 52 is only for the sake of the theory; not an essential element for the contact detector.

The operation of the contact detector 5 for locating the workpiece W relative to the wire electrode E is described below with reference to FIGS. 3A, 3B, 3C and 3D.

FIG. 3A illustrates the waveform of the input voltage Vgap of the comparator 50. FIG. 3B illustrates the output OUT of the comparator 50 that is supplied to the one shot multivibrator 51. FIG. 3C illustrates the output of the one shot multivibrator 51. FIG. 3D shows the output signal ST of the contact detector 5.

As illustrated in FIG. 3A, the comparator 50 receives the alternating voltage Vgap in 60 $\mu$sec cycle. This cycle of 60 $\mu$sec has been determined based on an output voltage of 5 V of the second power source V2 and the size of the machining gap. Assuming that the size of the machining gap is 2 $\mu$m, the unit electric field of the machining gap becomes $2.5 \times 10^4$ (V/cm). Since the mobility of an OH (−) ion is $20.5 \times 10^4$ (cm2·S$^{-1}$·V$^{-1}$), the moving speed of an OH (−) ion is approximately 0.5 ($\mu$m/$\mu$sec). If it is considered that electrolysis occurs when an OH (−) ion moves by approximately 20 $\mu$m, a movement of an OH (−) ion of 20 $\mu$m can be avoided by a change of polarity within 40 $\mu$sec. Thus, cycles below 80 $\mu$sec, or 60 $\mu$sec, is adopted in this embodiment. From the time T1 to the time T2, though the workpiece W is moved toward the wire electrode E, both have not yet come in contact with each other. Since the holding time of the high level output of the one shot multivibrator 51 is set at 100 $\mu$sec, the high level of its output can be kept when the input signal A repeats between the high level and the low level in a cycle of 60 $\mu$sec. At the time of T2 when the workpiece W is brought into contact with the wire electrode E, the voltage Vgap shows 0V and the input to the one shot multivibrator 51 is still low, as illustrated in FIGS. 3A and 3B. The holding time of the high level output of the one shot multivibrator 51 terminates at time T3 as illustrated in FIGS. 3C and 3D, turning its output Q to the low level and the output ST of the inverter 52 to the high level.

Thus, the duration from the time when the wire electrode E comes in contact with the workpiece W to the time when the output ST of the converter 52 turns to the high level is as short as 100 $\mu$sec at maximum. Since the frequency of the alternating voltage to be supplied to the machining gap is 10 KHz or greater, the effect of electrolysis prevention is great. The cycle of the alternating voltage supplied to the machining gap from the transistor switching bridge 1A can further be shortened to reduce a delay of contact detection. It is also possible to regard as a contact when the voltage between the wire electrode E and the workpiece W becomes 0.

Next, the operation of the electric discharge machining apparatus is described.

The workpiece W is fixed to a work table (not illustrated) and positioned near the wire electrode E. The work table is situated in a predetermined plane, i.e., an X-Y plane, and is moveable by a pair of motors 7x and 7y in the directions of the X-axis and the Y-axis. The motor driver 6 drives the X-axis motor 7x and the Y axis motor 7y based on the signal from the NC device 2. The motor driver 6 also feed the information on the position of the work table sent from an encoder or a linear scale back to the NC device 2 via the I/O circuit 3. The NC device 2 converts this feedback signal to the coordinate values representing a position of the workpiece W relative to the wire electrode E, displays the coordinate values in a display device (not illustrated). The movements of the wire electrode E and the workpiece W include a movement that takes place while being servo-controlled by the NC device 2 along the contour geometry based on the NC program with the electric discharge machining voltage applied to the machining gap, and a movement that tales place to locate the workpiece W. In this embodiment, the former is referred to as an EDM mode and the latter as a non-EDM mode. The coded instructions of the NC program that move the workpiece W relative to the tool electrode in the X-Y plane while applying the electric discharge machining voltage such as G01 (straight line interpolation), G02 (clockwise direction arc interpolation), G03 (counterclockwise direction arc interpolation) are classified into an EDM mode. On the other hand, the coded instructions of the NC program that move the workpiece W relative to the tool electrode in the X-Y plane but does not accompany with electric discharge machining such as G00 (straight line movement), G80 (contact detection movement) are classified into a non-EDM mode.

Figure 4:
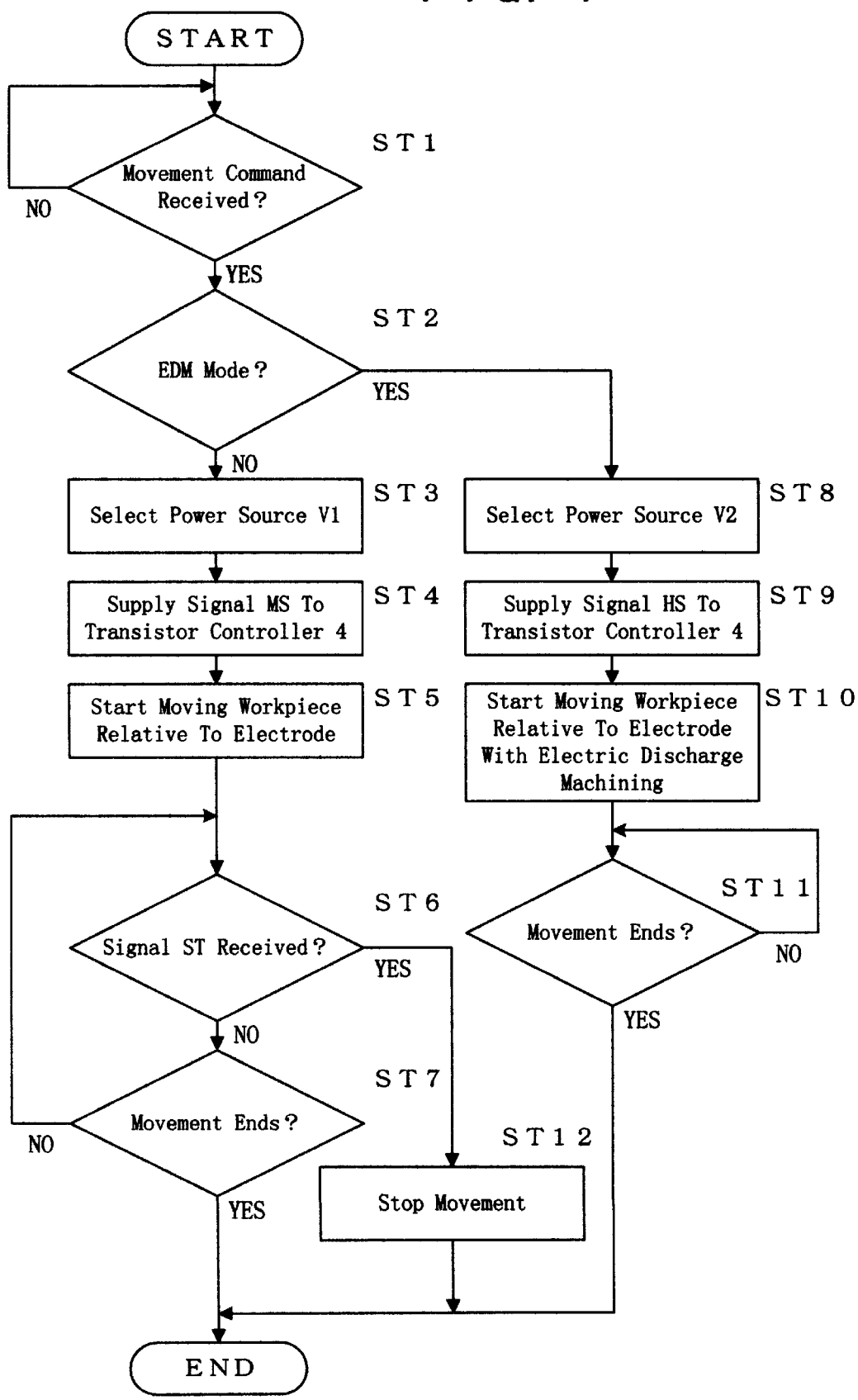
FIG. 4 is a flow chart showing the operation of the electric discharge machining apparatus of FIG. 1.

The operation of the NC device 2 will now be described with reference to the flow chart in FIG. 4.

At step ST1, if it is determined that the mode discriminating section 21 has received any movement command from the main control section 20, the flow continues to step ST2 where it is determined if the movement command is divided into an EDM mode. If at the step ST2 the movement command is divided into an EDM mode, at step ST8 the mode discriminating section 21 supplies a control signal WH to the switch S1 through the I/O circuit 3 to connect the transistor switching bridge 1A to the power source V1. Continuing to the step ST8, at step ST9 the main control section 20 supplies a control signal WH to the transistor controller 4, which controls the transistor switching bridge 1A so that a series of machining voltage pulses are applied to the machining gap based on a set ON-time and a set Off-time. At the same time, it supplies a control signal IP to the current limiting resistor selecting circuit R1 to define a magnitude of machining current. And, at step ST10 the main control section 20 supplies control signals to the motor driver 6 to drive motors 7x and 7y. Thus, the movement of the workpiece W relative to the wire electrode E with electrical discharge machining continues until the movement ends at step ST11.

If at the step ST2 the movement command is divided into a non-EDM mode, at step ST3 the mode discriminating section 21 supplies a signal WOH to the switch S1 through the I/O circuit 3 to connect the transistor switching bridge 1A to the power source V2. Continuing to the step ST3, at step ST4 the mode discriminating section 21 reads the set frequency stored in the memory 22, and supplies a control signal MS to the transistor controller 4 so that alternating voltage is applied to the machining gap at the set frequency, as illustrated in FIG. 3A. And, at step ST5 the main control section 20 supplies control signals to the motor driver 6 to drive motors 7x and 7y. Continuing to the step ST5, if it is determined that the NC device has received a signal ST from the contact detector 5, the flow continues to ST12. Otherwise, the movement of the workpiece W relative to the wire electrode E continues until the movement ends at step ST7. At the step ST12, the NC device 20 stops the movement and reads the position within the X-Y plane of the workpiece.

As understood from the embodiment of the present invention, a power supply for an electric discharge machining and another power supply for contact detection share a transistor switching bridge, largely reducing manufacturing costs.

The foregoing description of preferred embodiments of the invention have been presented for purposes of illustration and description. It is not intended to be exhaustive or to limit the invention to the precise form enclosed, and obviously many modifications and variations are possible in light of the above teaching. It is intended that the scope of the invention be defined by the claims appended hereto.

What is claimed is:

1. An electric discharge machining apparatus for machining a workpiece by supplying a series of voltage pulses to a machining gap formed between the workpiece to be machined and a tool electrode said apparatus comprising:
    a first power source for applying machining voltage to the machining gap;
    a second power source for applying voltage of equal to or lower than 20 V to the machining gap;
    a transistor switching bridge connected to both the workpiece and the tool electrode;
    a switch for selectively connecting one of the first and second power sources to the transistor switching bridge;
    a transistor controller for controlling on/off switching operation of the transistor switching bridge to alternatively change polarity of voltage being applied to the machining gap;
    a contact detector for electrically detecting the contact between the workpiece and the tool electrode, and;
    an NC device which controls the switch so that the first power source is connected to the transistor switching bridge when the application of the machining power is required while the second power source is connected to the transistor switching bridge when detecting the contact by the contact detector is required.

* * * * *